R. H. STEVENSON.
SKYLIGHT.
APPLICATION FILED DEC. 16, 1915.
1,203,154. Patented Oct. 31, 1916.
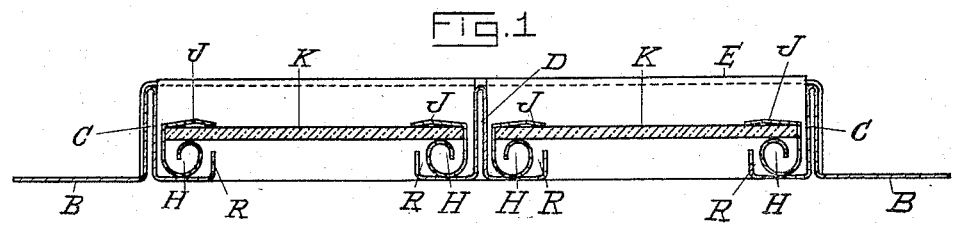
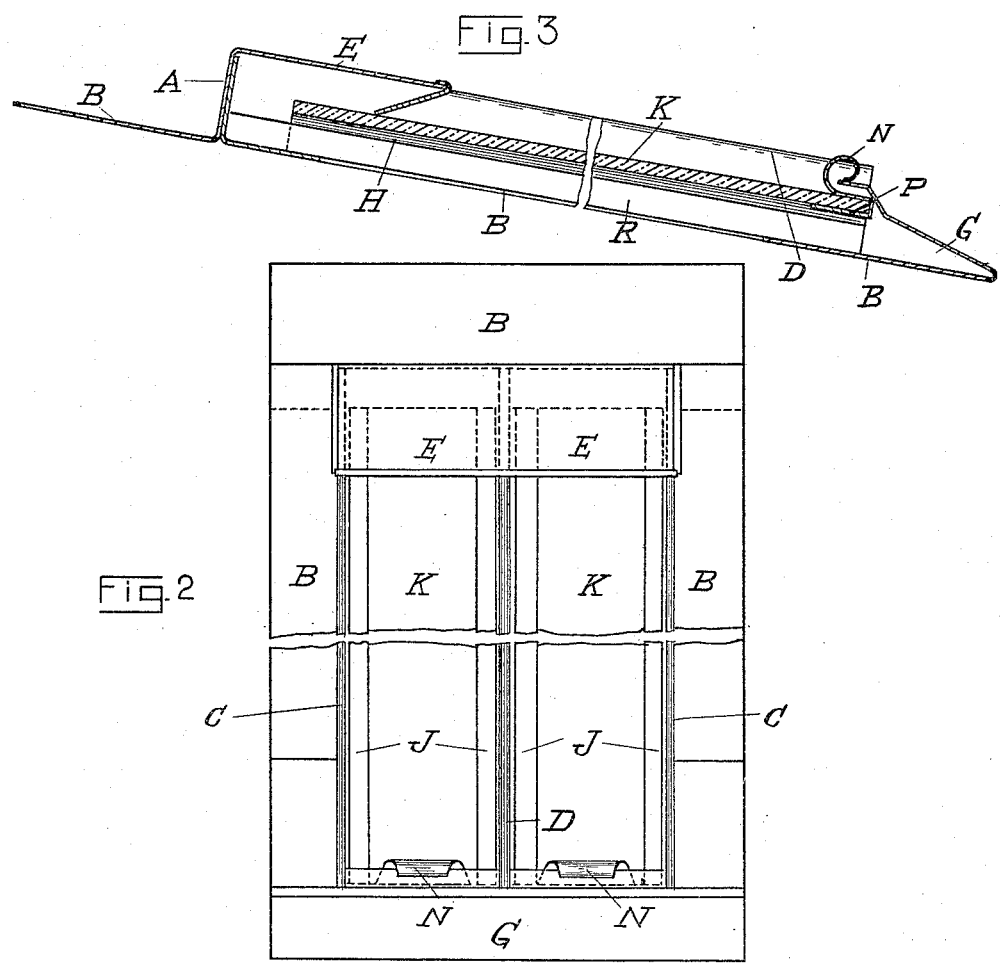
Robert Henry Stevenson
Inventor
by Laurence Langner
Attorney

UNITED STATES PATENT OFFICE.

ROBERT HENRY STEVENSON, OF AUCKLAND, NEW ZEALAND.

SKYLIGHT.

1,203,154. Specification of Letters Patent. Patented Oct. 31, 1916.

Application filed December 16, 1915. Serial No. 67,266.

*To all whom it may concern:*

Be it known that I, ROBERT HENRY STEVENSON, a subject of His Majesty the King of the United Kingdom of Great Britain and Ireland, resident of the city of Auckland, in the Provincial District of Auckland and Dominion of New Zealand, builder, have invented a new and useful Improved Skylight, of which the following is a specification.

This invention relates to skylights made of galvanized iron and the like, wherein glass is used in sections in each bay of a skylight.

The invention provides improvements which enable the glass of a single section to be easily and readily removed, without disturbing other sections.

The improvements consist in providing the glass of each section with separate side clips, or beads, which reinforces and strengthens the edge of the glass, and prevents the water from flowing around the edge of the glass, at the sides; the beading rests in the channeling of the division bar of the skylight, holding the glass clear of the edge of the channeling, thus allowing a space for condensed water adhering to the under side of glass to pass over the said edge of the channeling of the division bar of the skylight, and be carried away by the said channeling on to roof of building. A clip is provided which grips the bottom edge of the glass, with a curled outer edge that enables a hold to be obtained of the glass, for the purpose of removing the glass from the skylight frame.

The improvements further consist of a frame made to suit the glass squares with beading on the edges. The division bars and the side bars are being made with channeling to receive the bead fitted to the edge of the glass and are secured to the top and bottom bar, and they are of special improved construction to receive the top and bottom of the glass respectively, so that when fitted the whole forms a rigid frame.

The accompanying drawing shows three figures, of which,

Figure 1 is an end elevation in section of the skylight showing the ends of two sheets of glass held by side clips and beading and a transverse dividing bar centrally placed between said sheets of glass as well as side bars, Fig. 2 is a plan of the skylight showing all surface or outside parts and Fig. 3 is a side elevation in section showing side edges of glass, side clips, and beading, and portion of frame into which glass is fitted.

The frame A has the shape shown on the drawing, and has a back plate B on which the side bars C and center dividing bar D are built and over which at their upper ends a hood E is fixed, and a piece of zinc or other suitable metal is soldered or otherwise fixed to the lower end of the back plate B and is frontally turned over so as to form a turned up end G to the compartments made between the side bars C and center dividing bar D.

A curled bead H having its upper portion J given a hollow ridged formation is provided whereby two thereof can be fitted to the sheet of glass K in the manner shown on the drawing, the upper end of the sheet of glass K thus fitted by the bead H and held by the clip J is passed into one of the compartments beneath the hood E and being on a slope is held in position by the turned up end G, and rests within the channeling R. A clip given an outer curled over end formation N with a straight inner end has this inner end P slid between the bead H and the lower end of the glass K while the curled over end formation N presses on to the outside clip J thereby holding the glass K and bead H so firmly that the whole can thereby be lifted out of the compartment with ease. The turned over piece of zinc F provides a gutter M by means of which any moisture or water obtaining within the frame A will be drained off.

The bead H when fitted to the glass as above indicated holds the glass K clear of the edge of the channeling R thus providing space for condensed water occurring on the under side of the glass K to run down the channeling R and out by the gutter M. The application of the bead H to the glass K in the manner described tends to strengthen the edges of the glass and thereby largely prevents the breakage of the glass.

Having now fully described my invention, what I desire to claim and secure by Letters Patent is:—

1. A skylight structure comprising, a back plate and side bars; gutters on the inner sides of said bars; an upper and a lower end; panel edge gripping strips formed with lower rolled portions which rest in the gutters and support the panel above and clear thereof, said strips having also upper hollow ridged portions which press on the upper surface of the panel.

2. A skylight structure comprising, side bars guttered on their inner sides and formed integral with a back plate; a dividing bar guttered on both sides; a hood covering the upper ends of said bars; an upwardly turned back tapering lower end; and panel edge gripping strips resting in the guttered portions of the bars and supporting the panels above and clear of said guttered portions.

3. A skylight structure comprising side bars guttered on their inner sides and formed integral with a back plate; a dividing bar guttered on both sides; a hood covering the upper ends of said bars; an upwardly turned back tapering lower end; panel edge gripping strips formed with lower rolled portions which rest in the guttered portions of the bars and support the panels above and clear of said guttered portions, said strips having also upper hollow ridged portions which press on the upper surfaces of the panels.

4. A skylight structure comprising side bars formed integral with a back plate, and integral with gutters on their inner sides; a dividing bar formed integral with gutters situated one on each side thereof; a hood covering the upper end of said bars and having at its lower end inwardly projecting flaps contacting with the panels: an upwardly turned back tapering lower end forming a cross gutter at the lower end of the structure: panel edge gripping strips formed with lower rolled portions which rest in the gutters and support the panels above and clear thereof, said strips having also upper hollow ridged portions which press on the upper surfaces of the panels; and hand gripping pieces shaped to fit on the lower ends of the panels and formed with upper rolled portions which rest on the turned back lower end of the structure.

ROBERT HENRY STEVENSON.

Witnesses:
GEORGE WILLIAM BASLEY,
MARY CHRISTINA BRENNAN.

Copies of this patent may be obtained for five cents each, by addressing the "Commissioner of Patents, Washington, D. C."